(12) United States Patent
Makowski et al.

(10) Patent No.: US 10,792,815 B1
(45) Date of Patent: Oct. 6, 2020

(54) PERCEIVED COLOR HARMONY FIXTURE

(71) Applicant: GM Global Technology Operations LLC, Detroit, MI (US)

(72) Inventors: Kyle T. Makowski, Dearborn, MI (US); Robert L. Pobocik, Royal Oak, MI (US); Daniel P. Malouhos, Clawson, MI (US); Karen E. Bunker, Millington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 13 days.

(21) Appl. No.: 16/395,770

(22) Filed: Apr. 26, 2019

(51) Int. Cl.
| | |
|---|---|
| *G05G 11/00* | (2006.01) |
| *B25J 9/16* | (2006.01) |
| *F16H 25/20* | (2006.01) |
| *B25J 9/12* | (2006.01) |
| *B25J 13/06* | (2006.01) |

(52) U.S. Cl.
CPC ............ *B25J 9/1682* (2013.01); *B25J 9/126* (2013.01); *B25J 13/06* (2013.01); *F16H 25/20* (2013.01); *F16H 2025/2043* (2013.01)

(58) Field of Classification Search
CPC ...... B25J 9/1682; B25J 9/0084; B25J 9/0087; B25J 9/009; B25J 9/026; B25J 13/06
See application file for complete search history.

(56) References Cited

U.S. PATENT DOCUMENTS

| | | | | |
|---|---|---|---|---|
| 5,243,266 | A * | 9/1993 | Kasagami | B25J 9/1682 318/568.1 |
| 7,509,740 | B2 | 3/2009 | Munk et al. | |
| 8,240,971 | B2 * | 8/2012 | Sandmeier | B25J 9/041 414/744.5 |
| 9,610,694 | B2 * | 4/2017 | Duval | B25J 9/023 |
| 2005/0055132 | A1 * | 3/2005 | Matsumoto | B25J 9/1682 700/245 |
| 2005/0196263 | A1 * | 9/2005 | Tamura | B25J 9/023 414/744.5 |
| 2012/0224311 | A1 * | 9/2012 | Sutherland | G06K 9/00335 361/679.01 |
| 2016/0263641 | A1 * | 9/2016 | Savoy | B21J 15/10 |
| 2018/0104781 | A1 * | 4/2018 | Yasuda | B23Q 7/046 |
| 2019/0084149 | A1 * | 3/2019 | Raak | B25J 18/04 |

FOREIGN PATENT DOCUMENTS

| | | |
|---|---|---|
| CN | 1325321 C | 7/2007 |
| JP | 2013198918 A | 10/2013 |

* cited by examiner

*Primary Examiner* — Jake Cook
(74) *Attorney, Agent, or Firm* — Quinn IP Law

(57) ABSTRACT

A fixture assembly includes a first rail, a second rail coupled to the first rail, a first mount configured to support a first panel, a column coupled to the second rail, and a second mount movably coupled to the column. The first mount is movably coupled to the first rail to allow the first mount to move along the first rail in a first direction. The fixture assembly further includes a first servomotor coupled to the first mount to allow the first mount to rotate about a first axis. The fixture further includes a second servomotor coupled to the second mount to allow the second mount to rotate about a second axis. The fixture assembly includes a controller programmed to control the first servomotor and the second servomotor.

20 Claims, 4 Drawing Sheets

PERCEIVED COLOR HARMONY FIXTURE

INTRODUCTION

The present disclosure relates to a fixture and, more specifically, to a perceived color harmony fixture that simulates the interface between two panels, such as a body panel and a fascia of a vehicle.

SUMMARY

Sometimes, even though a first panel and a second panel are painted the same color, a person does not perceive or see the first panel and the second panel as having the same color due to the orientation of the first panel and the second panel relative to each other. It is desirable to simulate the interface between the first panel and the second panel when the first panel and the second panel are painted the same color in order to determine whether a person perceives the first panel and the second panel as having the same color. If the person does not perceive color harmony between the first panel and the second panel (i.e., that the first panel and the second panel have the same color) due to their position and/or orientation, the first panel and/or the second panel may be slightly changed until perceived color harmony is achieved. Initially, however, the first panel and the second panel are painted the same color, because the perceived color harmony may be the same as the real color harmony between the first panel and the second panel. The presently disclosed fixture assembly simulates the interfaces between two panels (e.g., a body panel and a fascia of a vehicle).

The fixture assembly includes a first rail, a second rail coupled to the first rail, and a first mount configured to support a first panel. The first mount is movably coupled to the first rail to allow the first mount to move along the first rail in a first direction. The fixture assembly further includes a column coupled to the second rail and a second mount movably coupled to the column to allow the second mount to move along the column in a second direction. The second mount is configured to support a second panel. The first direction is perpendicular to the second direction. The fixture assembly further includes a first servomotor coupled to the first mount to allow the first mount to rotate about a first axis. The first axis is perpendicular to the first direction. The fixture further includes a second servomotor coupled to the second mount to allow the second mount to rotate about a second axis. The second axis is parallel to the first direction, and the second axis is perpendicular to the second direction. The fixture assembly further includes a controller in electronic communication with the first servomotor and the second servomotor, wherein the controller is programmed to control a movement of the first panel and the second panel through the first servomotor and the second servomotor.

The fixture assembly may further include a user interface in electronic communication with the controller. The user interface includes a first input device and a second input device. The first input device is configured to receive input from a user to control the first servomotor. The second input device is configured to receive input from the user to control the second servomotor. The first input device may be a first rotary encoder, and the second input device may be a second rotary encoder.

The fixture assembly may further include a third rail and a fourth rail. Each of the third rail and the fourth rail is elongated along the first direction. The second rail may be directly coupled to the third rail and the fourth rail. The second rail is elongated along a third direction. The third direction is perpendicular to the first direction and the second direction. The first rail may be directly coupled to the second rail.

The fixture assembly may further include a fifth rail directly coupled to the third rail. The fifth rail may be directly coupled to the fourth rail. The fifth rail is elongated along the third direction.

The fixture assembly may further include a first plate coupled to the first mount. The first plate may be directly coupled to the first rail. The first plate is slidably coupled to the first rail. The first plate interconnects the first mount and the first rail. As such, the first mount and the first plate move in unison along the first direction.

The fixture assembly may further include a second plate coupled to the column. The second plate may be directly coupled to the column. The second plate is slidably coupled to the column. The second plate interconnects the second mount and the column. As such, the second mount and the second plate move in unison along the second direction.

The user interface includes a display configured to show a position of the first panel and the second panel. The fixture assembly further includes a power supply electrically coupled to the user interface, the first servomotor, and the second servomotor to supply electricity to the user interface, the first servomotor, and the second servomotor.

Each of the first mount and the second mount is configured as a mounting bracket. Each of the first rail, the second rail, the third rail, the fourth rail, the fifth rail, and the column are wholly made of extruded aluminum.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
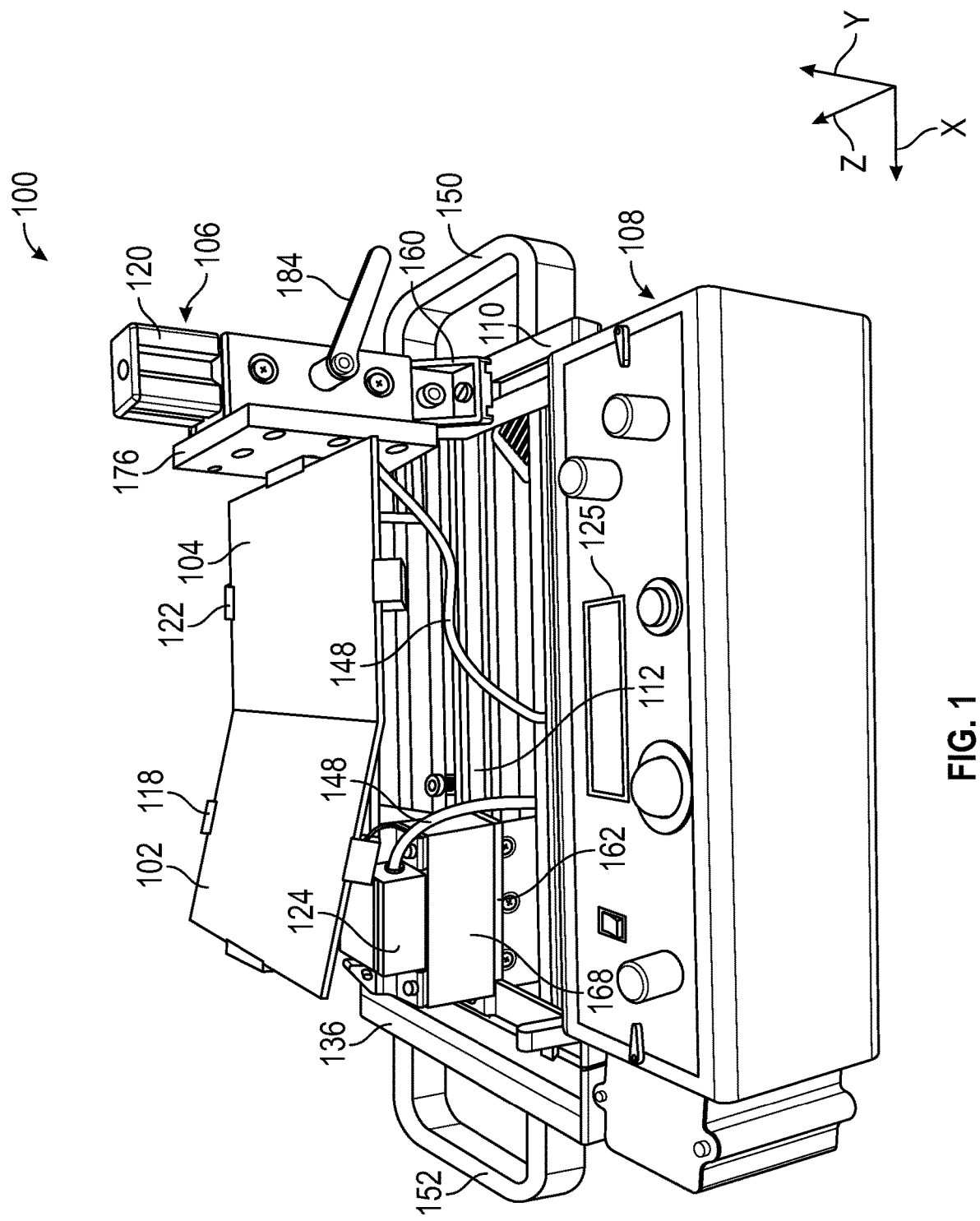
FIG. 1 is a schematic perspective view of a fixture system including a perceived color harmony fixture assembly, a first panel and a second panel, wherein the perceived color harmony fixture assembly is configured to move the first panel and the second panel relative to each other.
Figure 2:
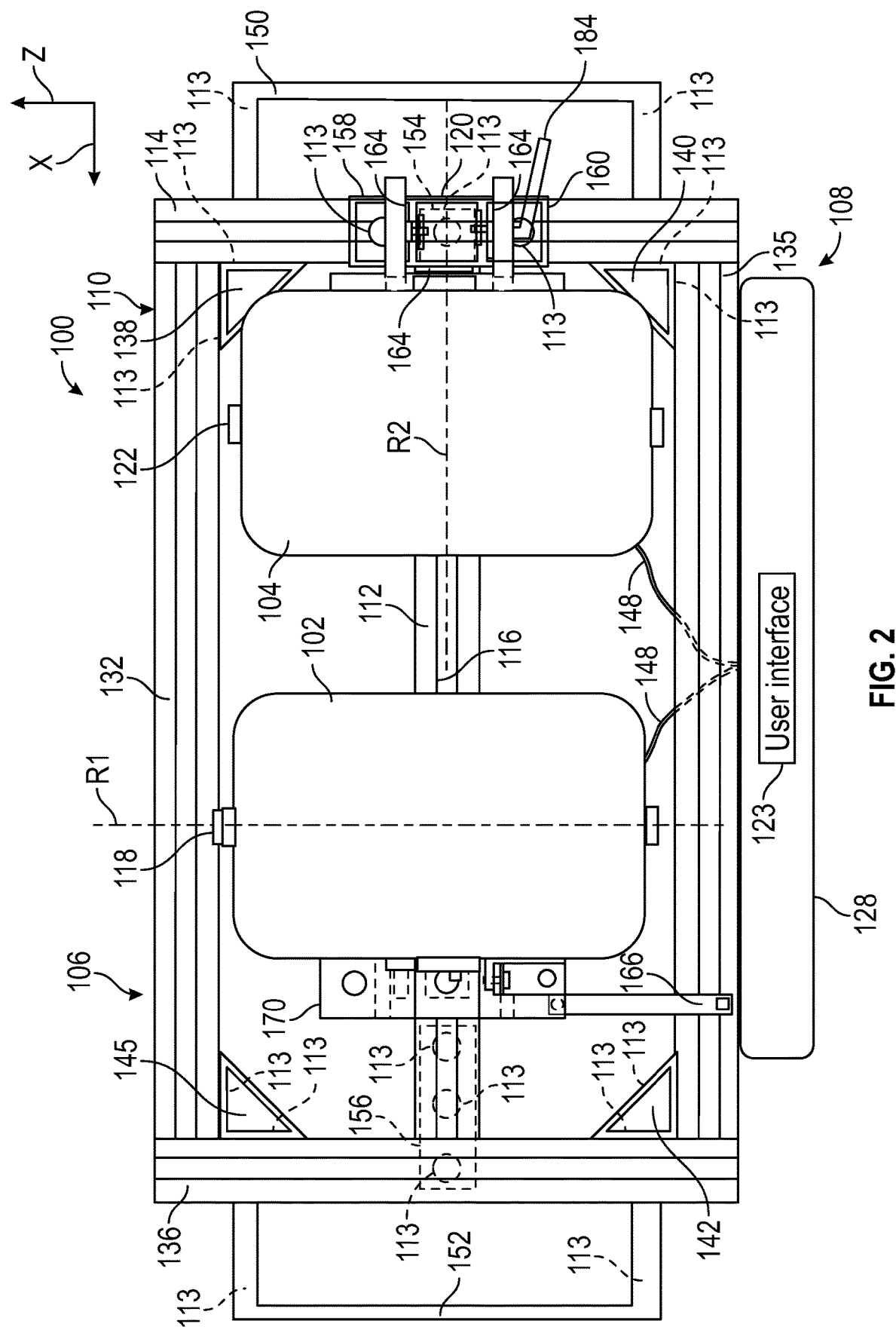
FIG. 2 is a schematic top view of the fixture system of FIG. 1.
Figure 3:
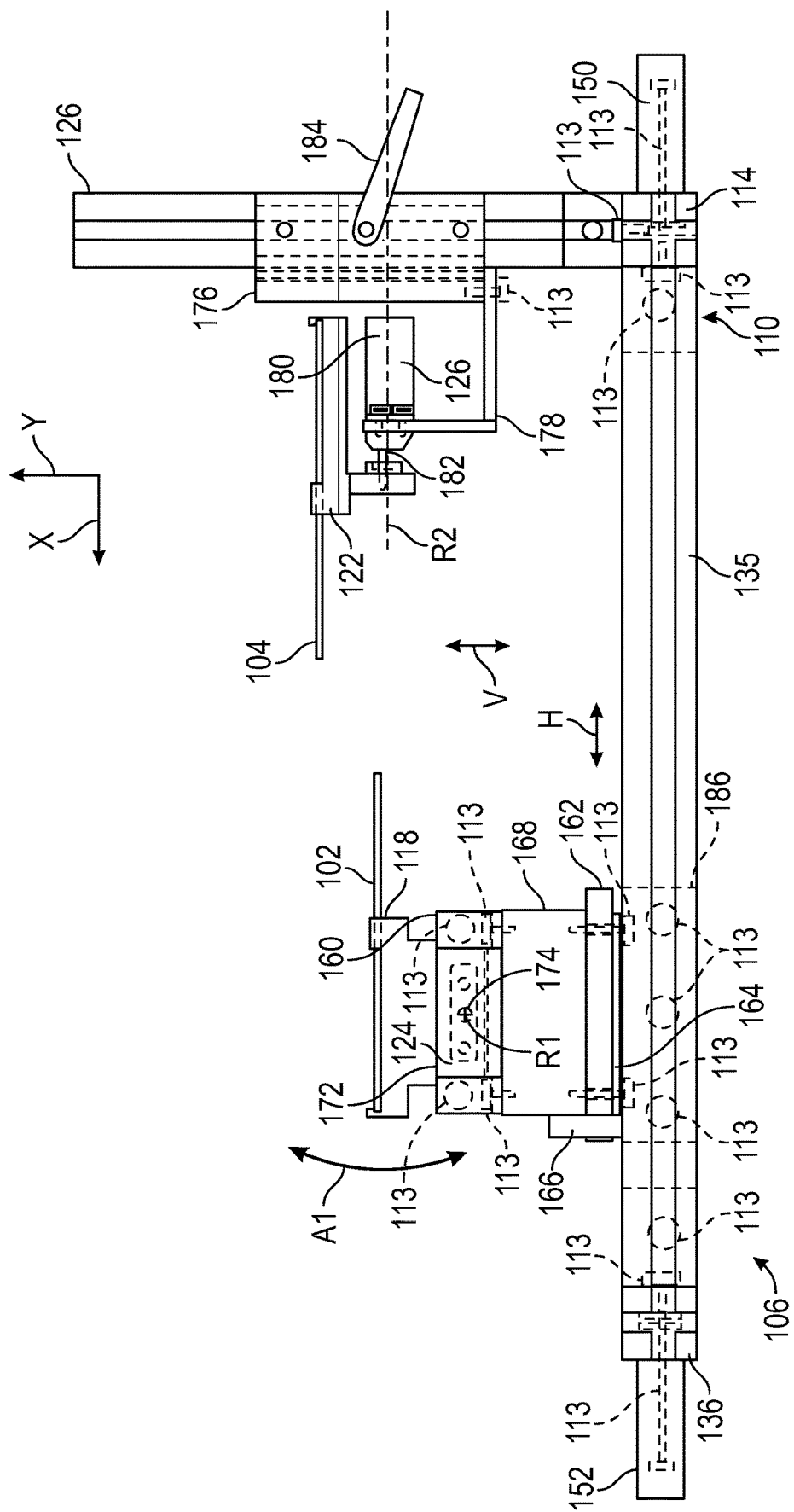
FIG. 3 is a schematic side view of the fixture system of FIG. 1.

FIGS. 1-3 illustrate a fixture system 100 for simulating an interface between a first panel 102 and a second panel 104. As a non-limiting example, the first panel 102 may be a body panel of a vehicle and the second panel 104 may be fascia of a vehicle. However, it is contemplated that the first panel 102 and the second panel 104 may be other kinds of panels such as building panels. Sometimes, even though the first panel 102 and the second panel 104 are painted the same color, a person does not perceive or see the first panel 102 and the second panel 104 as having the same color due to the orientation of the first panel 102 and the second panel 104 relative to each other. It is desirable to simulate the interface between the first panel 102 and the second panel 104 when the first panel 102 and the second panel 104 are painted the same color in order to determine whether a person perceives the first panel 102 and the second panel 104 as having the same color. If the person does not perceive color harmony between the first panel 102 and the second panel 104 (i.e., that the first panel 102 and the second panel 104 have the same color) due to their position and/or orientation, the first panel 102 and/or the second panel 104 may be slightly changed until perceived color harmony is achieved. Initially, however, the first panel 102 and the second panel 104 are painted the same color, because the perceived color harmony may be the same as the real color harmony between the first panel 102 and the second panel 104.

The fixture system 100 is configured to simulate the interface between the first panel 102 and the second panel 104 of a vehicle, a building, or any other structure that has panels that are not flushed and parallel relative to each other. In the depicted embodiment, the fixture system 100 includes the first panel 102, the second panel 104, a fixture assembly 106, and a control system 108. The fixture assembly 106 includes a fixture 110, which is configured to be digitally controlled by the control system 108. The fixture 110 may be scaled and easily reproduced for other applications. Moreover, the fixture 110 may be manufactured using an additive manufacturing process, such as 3D printing.

With specific reference to FIGS. 2 and 3, the fixture 110 includes a first rail 112, a second rail 114 coupled to the first rail 112, and a column 120 coupled to the second rail 114. The first rail 112 is elongated along a first direction X, and the column 120 is elongated along a second direction Y. The second rail 114 is elongated along a third direction Z. The first direction X is perpendicular to the second direction Y and the third direction Z. The first rail 112 defines a slot 116 elongated along the first direction X. The first rail 112 may be directly coupled to the second rail 114 to enhance the structure integrity of the fixture 110. One or more fasteners 113 may be used to directly couple the first rail 112 to the second rail 114. As non-limiting examples, the fasteners 113 may be bolts, studs, screws, or the like. The fixture 110 further includes a first mount 118 configured to support the first panel 102. The first mount 118 is movably coupled to the first rail 112 to allow the first mount 118 to move along the first rail 112 in the first direction X as indicated by double arrow H. Thus, when the first mount 118 supports the first panel 102, the first panel 102 moves in unison with the first mount 118 along the first direction X. The fixture 110 includes a column 120 elongated along the second direction Y. The column 120 may be directly coupled to the second rail 114 to enhance the structural integrity of the fixture 110. One or more fasteners 113 may be used to directly couple the column 120 to the second rail 114. The fixture 110 further includes a second mount 122 movably coupled to the column 120 to allow the second mount 122 to move along the column 120 in the second direction Y. The second mount 122 is configured to support the second panel 104. When the second mount 122 supports the second panel 104, the second panel 104 moves in unison with the second mount 122 along the third direction Z.

The fixture 110 further includes a first servomotor 124 coupled to the first mount 118 to allow the first mount 118 to rotate about a first axis R1. The first servomotor 124 may be directly coupled to the first mount 118 to enhance the structural integrity of the fixture 110. The first axis R1 is parallel to the third direction Z. The fixture assembly 106 includes a second servomotor 126 coupled to the second mount 122 to allow the second mount 122 to rotate about a second axis R2. The second axis R2 is perpendicular to the first direction and the second direction. The fixture assembly 106 further includes a control system 108 having a user interface 123.

Figure 4:
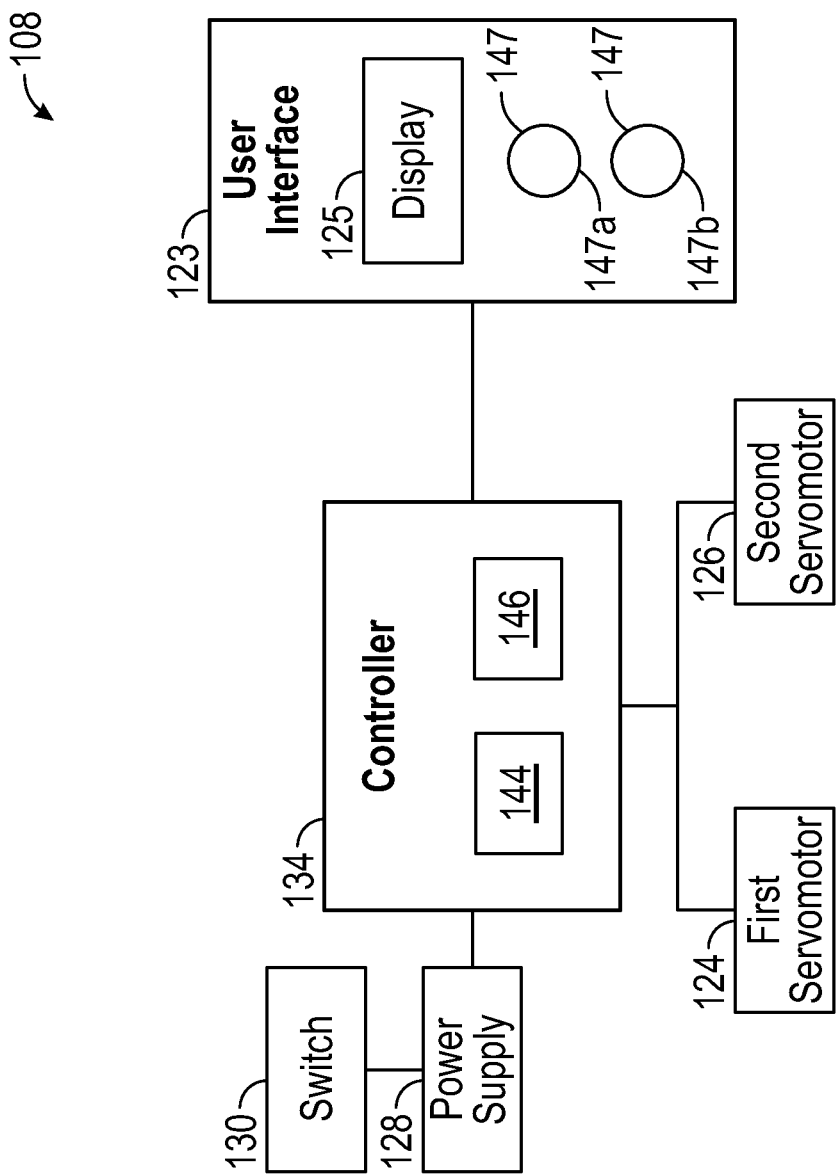
FIG. 4 is a schematic block diagram of a control system of the fixture system of FIG. 1.

With reference to FIG. 4, the control system 108 includes a controller 134 in electronic communication with the first servomotor 124 and the second servomotor 126, wherein the controller 134 is programmed to control a movement of the first panel and the second panel through the first servomotor 124 and the second servomotor 126.

The controller 134 includes at least one processor 144 and a non-transitory computer readable storage device or media 146. The processor 144 can be a custom made or commercially available processor, a central processing unit (CPU), a graphics processing unit (GPU), an auxiliary processor among several processors associated with the controller 134, a semiconductor-based microprocessor (in the form of a microchip or chip set), a macroprocessor, a combination thereof, or generally a device for executing instructions. The computer readable storage device or media 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The computer-readable storage device or media 146 may be implemented using a number of known memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 134 in controlling the first servomotor 124 and the second servomotor 126.

The instructions may include one or more separate programs, each of which comprises an ordered listing of executable instructions for implementing logical functions. The instructions, when executed by the processor 144, receive and process signals from input devices 147 (e.g., rotary encoders, buttons, and/or touchscreen), perform logic, calculations, methods and/or algorithms for automatically controlling the components of the first servomotor 124 and the second servomotor 126, and generate control signals to automatically control the first servomotor 124 and the second servomotor 126 based on the logic, calculations, methods, and/or algorithms. Although a single controller 134 is shown in FIG. 4, embodiments of the fixture system 100 may include a number of controllers 134 that communicate over a suitable communication medium or a combination of communication mediums and that cooperate to process the sensor signals, perform logic, calculations, methods, and/or algorithms, and generate control signals to automatically control the first servomotor 124 and the second servomotor 126. Accordingly, the controller 134 is in electronic communication with the first servomotor 124 and the second servomotor 126.

In various embodiments, one or more instructions of the controller 134 are embodied in the control system 108. The control system 108 includes a user interface 123, which may be a touchscreen in the dashboard and is in electronic communication with the controller 134. The user interface 23 is configured to receive inputs by a user (e.g., vehicle operator). The user interface 23 includes one more input devices 147, such as rotary encoders. Accordingly, the controller 134 is configured to receive inputs from the user via the user interface 23. The user interface 23 includes a display 125, such as a light emitting diode (LED) display, configured to display information to the user, such as the position of the first panel 102 and the second panel 104.

The control system 108 further includes a power supply 128 electrically connected to the controller 134. The power supply 128 may be a battery or a battery pack and is configured to supply electrical energy to the controller 134. The control system 108 includes a switch 130 electrically connected to the power supply 128. The switch 130 may be an on/off switch and is configured to turn off or on the control system 108.

The user interface 123 is in electronic communication with the controller 134 and input devices 147, such as a first input device 147a and a second input device 147b. The first input device 147a is configured to receive input from a user to control the first servomotor 124. The second input device 147b is configured to receive input from the user to control the second servomotor 126. The first input device 147a may be a first rotary encoder, and the second input device 147b may be a second rotary encoder. One or more wires 148 may be used to electrically couple the control system 108 to the first servomotor 124 and the second servomotor 126.

The fixture 110 includes a third rail 132 and a fourth rail 135. Each of the third rail 132 and the fourth rail 135 is elongated along the first direction X. The second rail 114 is directly coupled to the third rail 132 and the fourth rail 135 to enhance the structure integrity of the fixture 110. The second rail 114 is elongated along the third direction Z. The first rail 112 may be directly coupled to the second rail 114 to enhance the structural integrity of the fixture 110. The fixture 110 includes a fifth rail 136 directly coupled to the third rail 132 to enchant the structural integrity of the fixture 110. The fifth rail 136 is directly coupled to the fourth rail 135 to enhance the structural integrity of the fixture 110. The fifth rail 136 is elongated along the third direction Z.

The fixture 110 further includes a first corner brace 138, a second corner brace 140, a third corner brace 142, and a fourth corner brace 145. Each of the first corner bracer 138, the second corner brace 140, the third corner brace 142, and the fourth corner brace 145 may have a triangular shape to enhance structural integrity of the fixture 110. The first corner brace 138 is directly connected to the second rail 114 and the third rail 132. One or more fasteners 113 may be used to directly connect the first corner brace 138 to the second rail 114 and the third rail 132. The second corner brace 140 may be directly connected to the second rail 114 and the fourth rail 135 to enhance the structural integrity of the fixture 110. One or more fasteners 113 may be used to directly couple the second corner brace 140 to the second rail 114 and the fourth rail 135. The third corner brace 142 may be directly coupled to the fourth rail 135 and the fifth rail 136. One or more fasteners 113 may be used to directly connect the fourth rail 135 and the fifth rail 136. The fourth corner brace 145 may be directly coupled to the fifth rail 136 and the third rail 132. One or more fasteners 113 may be used to directly couple the fourth corner brace 145 to the fourth rail 135 and the fifth rail 136. Each of the first rail 112, the second rail 114, the third rail 132, the fourth rail 135, the fifth rail 136, and the column 120 are wholly made of extruded aluminum to minimize cost.

The fixture 110 further includes a first handle 150 for manually holding the fixture system 100. The first handle 150 may be directly coupled to the second rail 114 to enhance the structural integrity of the fixture 110. The fixture system 100 may further include a second handle 152 for manually holding the fixture 110. The second handle 152 may be directly coupled to the fifth rail 136. One or more fasteners 113 may be used to directly couple the second handle 152 to the fifth rail 136.

As discussed above, the first rail 112 may be directly coupled to the second rail 114. A first joiner plate 154 and fasteners 113 may be used to directly couple the first rail 112 to the second rail 114. As discussed above, the fifth rail 136 may be directly coupled to the first rail 112. A second joiner plate 156 and fasteners 113 may be used to directly couple the first rail 112 to the fifth rail 136.

The fixture 110 may further include a fifth corner brace 158 and a sixth corner brace 160. Each of the fifth corner brace 158 and the sixth corner brace 160 may be directly coupled to the column 120 and the second rail 114 to enhance the structural integrity of the fixture 110. One or more fasteners 113 may be used to directly couple the fifth corner brace 158 and the sixth corner brace 160 to the column 120.

The fixture 110 may further include a first plate 162 for adjusting the horizontal position of the first panel 102 relative to the second panel 104 and may therefore be referred to as the horizontal adjustment plate. One or more fasteners 113 may be used to movably (and directly) couple the first plate 162 to the first rail 112. One or more bushing 164 may be disposed between the first plate 162 and the first rail 112. An arm 166, such as a horizontal adjustment arm, may be directly connected to the first plate 162 to manually move the first plate 162 along the first direction X (i.e., horizontally) as indicated by double arrows H.

The fixture 110 further includes a riser block 168 coupled between the first plate 162 and the first servomotor 124 to adjust the height of the first servomotor 124 relative to the second servomotor 126. One or more first mouthing brackets 170 may be coupled between the riser block 168. The first mounting brackets 170 are configured to hold and support the first servomotor 124. One or more fasteners 113 may be used to directly connect the first mounting brackets 170 to the first servomotor 124. The first servomotor 124 includes a first housing 172 and a first spindle 174 extending from the first housing 172. The first axis R1 extends along the first spindle 174. The first spindle 174 is coupled to the first mount 118 to allow the first panel 102 to rotate about the first axis R1 as shown by double arrows µl. The first plate 162 is directly coupled to the first mount 118 and is coupled to the first rail 112. The first plate 162 is slidably coupled to the first rail 112, and the first plate 162 interconnects the first mount 118 and the first rail 112. As such, the first mount 118 and the first plate 162 move in unison along the first direction X. A third joiner plate 186 may movably interconnect the first plate 162 to the first rail 112. One or more fasteners 113 may couple the third joiner plate 186 to the first rail 112.

The fixture 110 further includes a second plate 176 directly coupled to the column 120 to enhance the structural integrity of the fixture system 100. The second plate 176 is movable along the column 120 in the second direction Y and may therefore be referred to as the vertical adjustment plate. The second plate 176 is slidably coupled to the column 120 to allow the second plate 176 to move along the second direction Y as indicated by double arrows V. The second plate 176 interconnects the second mount 122 and the column 120. As such, the second mount 122 and the second plate 176 move in unison along the second direction Y. One or more second mounting brackets 178 is directly connected to the second plate 176 and the second servomotor 126 to enhance the structure integrity of the fixture system 100. One or more fasteners 113 may be used to directly couple the second mounting brackets 178 to the second plate 176. One or more fasteners 113 may be used to directly couple the second mounting brackets 178 to the second servomotor 126.

The second servomotor 126 includes a second housing 180 and a second spindle 182 extending from the second housing 180. The second axis R2 extends through the second spindle 182, thereby allowing the second mount 122 and the second panel 104 to rotate about the second axis R2.

The fixture system 100 further includes a brake handle 184 coupled to the second plate 176. The brake handle 184 may be referred to as the vertical adjustment handle and is configured to rotate in order to fix the position of the second plate 176 relative to the column 120, thereby fixing the position of the second panel 104 along the second direction Y. One or more bushings 164 may be disposed between the column 120 and second plate 176.

The detailed description and the drawings or figures are exemplary of the description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A fixture assembly, comprising:
a first rail;
a second rail coupled to the first rail;
a first mount configured to support a first panel, wherein the first mount is movably coupled to the first rail to allow the first mount to move along the first rail in a first direction;
a column coupled to the second rail;
a second mount movably coupled to the column to allow the second mount to move along the column in a second direction, the second mount is configured to support a second panel, and the first direction is perpendicular to the second direction;
a first servomotor coupled to the first mount to allow the first mount to rotate about a first axis, wherein the first axis is perpendicular to the first direction;
a second servomotor coupled to the second mount to allow the second mount to rotate about a second axis, wherein the second axis is parallel to the first direction, and the second axis is perpendicular to the second direction; and
a controller in electronic communication with the first servomotor and the second servomotor, wherein the controller is programmed to control a movement of the first panel and the second panel through the first servomotor and the second servomotor.

2. The fixture assembly of claim 1, further comprising a user interface in electronic communication with the controller, wherein the user interface includes a first input device and a second input device, the first input device is configured to receive input from a user to control the first servomotor, the second input device is configured to receive input from the user to control the second servomotor, the first input device is a first rotary encoder, and the second input device is a second rotary encoder.

3. The fixture assembly of claim 2, further comprising a third rail and a fourth rail, wherein each of the third rail and the fourth rail is elongated along the first direction, the second rail is directly coupled to the third rail and the fourth rail, the second rail is elongated along a third direction, the third direction is perpendicular to the first direction and the second direction, and the first rail is directly coupled to the second rail.

4. The fixture assembly of claim 3, further comprising a fifth rail directly coupled to the third rail, the fifth rail is directly coupled to the fourth rail, and the fifth rail is elongated along the third direction.

5. The fixture assembly of claim 4, further comprising a first plate coupled to the first mount, the first plate directly coupled to the first rail, the first plate is slidably coupled to the first rail, and the first plate interconnects the first mount and the first rail such that the first mount and the first plate move in unison along the first direction.

6. The fixture assembly of claim 5, further comprising a second plate coupled to the column, the second plate is directly coupled to the column, the second plate is slidably coupled to the column, the second plate interconnects the second mount and the column such that the second mount and the second plate move in unison along the second direction.

7. The fixture assembly of claim 6, wherein the user interface includes a display configured to show a position of the first panel and the second panel.

8. The fixture assembly of claim 7, further comprising a power supply electrically coupled to the user interface, the first servomotor, and the second servomotor to supply electricity to the user interface, the first servomotor, and the second servomotor.

9. The fixture assembly of claim 8, wherein each of the first mount and the second mount is configured as a mounting bracket.

10. The fixture assembly of claim 9, wherein each of the first rail, the second rail, the third rail, the fourth rail, the fifth rail, and the column are wholly made of extruded aluminum.

11. A fixture system, comprising:
a first panel;

a second panel, wherein the second panel is painted in a same color as the first panel;

a first rail;

a second rail coupled to the first rail;

a first mount configured to support the first panel, wherein the first mount is movably coupled to the first rail to allow the first mount to move along the first rail in a first direction;

a column coupled to the second rail;

a second mount movably coupled to the column to allow the second mount to move along the column in a second direction, the second mount is configured to support the second panel, and the first direction is perpendicular to the second direction;

a first servomotor coupled to the first mount to allow the first mount to rotate about a first axis, wherein the first axis is parallel to the second direction;

a second servomotor coupled to the second mount to allow the second mount to rotate about a second axis, wherein the second axis is perpendicular to the first direction and the second direction; and a controller in electronic communication with the first servomotor and the second servomotor, wherein the controller is programmed to control a movement of the first panel and the second panel through the first servomotor and the second servomotor.

12. The fixture system of claim 11, further comprising a user interface in electronic communication with the controller, wherein the user interface includes a first input device and a second input device, the first input device is configured to receive input from a user to control a movement of the first servomotor, the second input device is configured to receive input from the user to control a movement of the second servomotor, the first input device is a first rotary encoder, the second input device is a second rotary encoder.

13. The fixture system of claim 12, further comprising a third rail and a fourth rail, wherein each of the third rail and the fourth rail is elongated along the first direction, the second rail is directly coupled to the third rail and the fourth rail, and the second rail is elongated along the second direction, and the first rail is directly coupled to the second rail.

14. The fixture system of claim 13, further comprising a fifth rail directly coupled to the third rail, the fifth rail is directly coupled to the fourth rail, the fifth rail is elongated along the second direction.

15. The fixture system of claim 14, further comprising a first plate directly coupled to the first mount, the first plate directly coupled to the first rail, the first plate is slidably coupled to the first rail, and the first plate interconnects the first mount and the first rail such that the first mount and the first plate move in unison along the first direction.

16. The fixture system of claim 15, further comprising a second plate coupled to the column, the second plate is directly coupled to the column, the second plate is slidably coupled to the column, the second plate interconnects the second mount and the column such that the second mount and the second plate move in unison along the second direction.

17. The fixture system of claim 16, the second plate is directly coupled to the column, the second plate is slidably coupled to the column, the second plate interconnects the second mount and the column such that the second mount and the second plate move in unison along the second direction.

18. The fixture system of claim 17, wherein the user interface includes a display configured to show a position of the first panel and the second panel.

19. The fixture system of claim 18, further comprising a power supply electrically coupled to the user interface, the first servomotor, and the second servomotor to supply electricity to the user interface, the first servomotor, and the second servomotor.

20. The fixture system of claim 19, wherein each of the first mount and the second mount is configured as a bracket, and each of the first rail, the second rail, the third rail, the fourth rail, the fifth rail, and the column are wholly made of extruded aluminum.

* * * * *